United States Patent [19]

Maida

[11] 4,253,750
[45] Mar. 3, 1981

[54] POWER SUPPLY CONTROL APPARATUS FOR CAMERA

[75] Inventor: Osamu Maida, Tokyo, Japan

[73] Assignee: Nippon Kogaku K.K., Tokyo, Japan

[21] Appl. No.: 39,145

[22] Filed: May 15, 1979

[30] Foreign Application Priority Data

May 20, 1978 [JP] Japan ................................ 53-59524

[51] Int. Cl.³ ............................ G03B 7/26; G01J 1/44
[52] U.S. Cl. ............................... 354/23 D; 354/60 L; 354/60 A; 356/226
[58] Field of Search ................. 354/23 D, 60 R, 60 A, 354/60 L, 60 E, 53, 289; 356/218, 226; 307/41, 132 E, 240, 296 A; 328/260, 261

[56] References Cited

U.S. PATENT DOCUMENTS

| 3,742,826 | 7/1973 | Kohtani | 354/23 D |
| 3,909,137 | 9/1975 | Kisanuki | 356/226 |
| 3,955,892 | 5/1976 | Numata et al. | 354/23 D X |
| 3,971,048 | 7/1976 | Ito et al. | 354/60 L |
| 4,003,063 | 1/1977 | Takahashi et al. | 354/60 R X |
| 4,142,785 | 3/1979 | Saito | 354/60 A X |

FOREIGN PATENT DOCUMENTS 571876  9/1977  U.S.S.R. ............................. 307/296 A

Primary Examiner—Donald A. Griffin
Assistant Examiner—William B. Perkey
Attorney, Agent, or Firm—Shapiro and Shapiro

[57] ABSTRACT

An electric power supply control circuit is designed to interrupt the power supply to at least either one of a calculating circuit or an analog-digital converting circuit during the interval between two succeeding sample operations in order to reduce power consumption.

5 Claims, 11 Drawing Figures

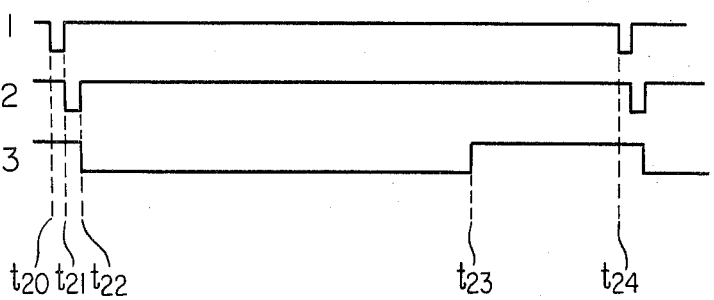
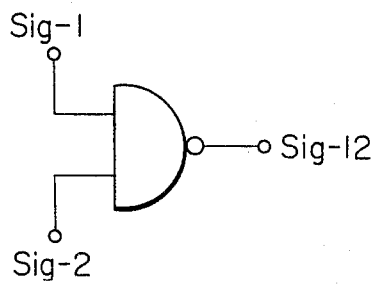
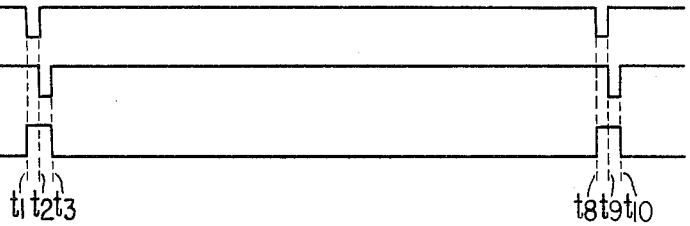

POWER SUPPLY CONTROL APPARATUS FOR CAMERA

BACKGROUND OF THE INVENTION

1. Field of the Invention

The present invention relates to an electric power supply control apparatus for reducing electric power consumption in a photographic camera adapted for digitally processing an exposure factor such as the brightness of an object and controlling and/or indicating the amount of exposure.

2. Description of the Prior Art

There is already known a camera comprising a circuit for computing an analog signal corresponding to an appropriate exposure in response to an exposure factor, an analog-digital converting circuit for converting said analog signal into a digital signal, a sample and hold circuit for periodically sampling said digital signal at the interval of a determined time and holding thus sampled signal, and a circuit for controlling and indicating the amount of exposure in response to the digital signal thus held by said sample and hold circuit.

In the function of such camera, the operation of the calculating circuit, analog-digital converting circuit, etc. is unnecessary during the interval between two succeeding data samplings and the power consumption during said period is merely useless.

SUMMARY OF THE INVENTION

The object of the present invention, therefore, is to provide an electric power supply control circuit in such a camera which is capable of reducing power consumption by interrupting the power supply to at least either one of the calculating circuit and analog-digital converting circuit during the interval between two succeeding sampling operations.

BRIEF DESCRIPTION OF THE DRAWINGS

The invention will be described more particularly with reference to the accompanying drawings, in which:

FIG. 2 is a wave-form chart of the signals generated by the digital control circuit in the embodiment shown in FIG. 1;

FIG. 6 is a circuit drawing showing an example for obtaining the data memory signal; and FIG. 7 is a wave-form chart showing the relation of input and output in FIG. 6.

DESCRIPTION OF THE PREFERRED EMBODIMENTS

Now the present invention will be described in detailed in the following explanation taken in conjunction with the attached drawings.

Figure 1:
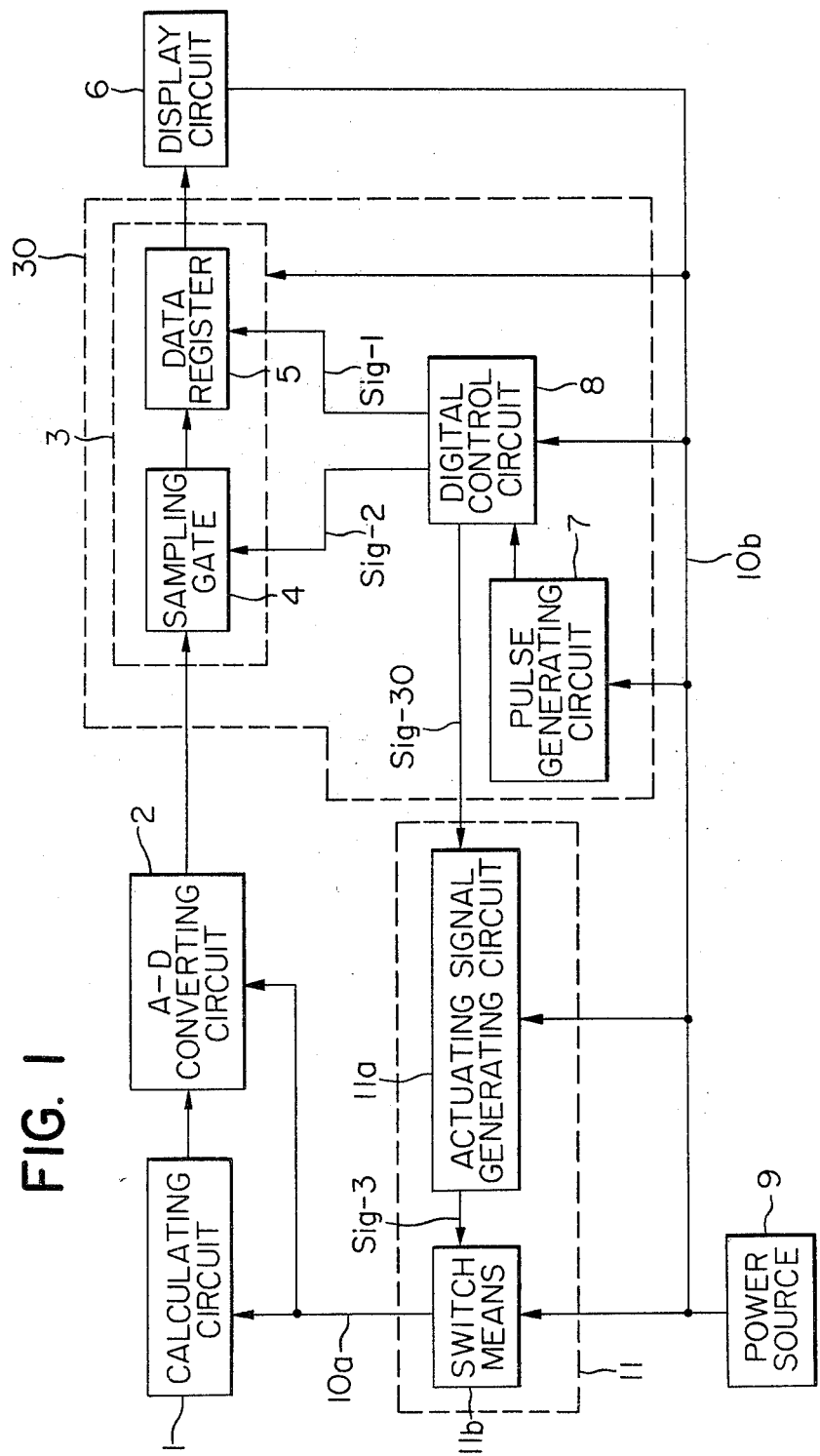
FIG. 1 is a block diagram showing an embodiment of the power supply control circuit of the present invention for use in a photographic camera.

Referring to FIG. 1 showing a block diagram of the apparatus of the present invention, there is provided a calculating circuit 1 for generating an analog voltage corresponding to an appropriate exposure in response to exposure factors such as the brightness of an object or the sensitivity of photographic film. Said circuit may be designed exclusively for the shutter speed priority diaphragm or programmed exposure mode, as these exposure modes differ merely in whether the exposure is regulated by the shutter speed, diaphragram or the combination thereof.

An analog-digital converting circuit 2 converts the analog signal from said calculating circuit 1 into digital data.

A sample and hold circuit 3 comprises a sampling gate 4 and a data register 5, wherein said sampling gate 4 is controlled by a sampling signal sig-2, to be explained later, to control the transmission of digital data from said analog-digital converting circuit 2 to a data register 5, which holds said digital data therein and is reset by a reset signal sig-1, to be explained later.

A display circuit 6 indicates the controlled data of exposure according to a predetermined display mode and in response to the digital data stored in said data register 5.

A pulse generating circuit 7 generates clock pulses of a predetermined frequency, upon receipt of which a digital control circuit 8 generates reset signal sig-1 and sampling signals sig-2 at predetermined intervals, said signals being shown as L-level pulses respectively in FIG. 2A and FIG. 2B. As shown in these figures, each reset signal sig-1 is immediately followed by a sampling signal sig-2 in order that the content of the data register 5 are reset by said reset signal sig-1 and then receives new digital data through the sampling gate 4 to be opned by said sampling signal sig-2. The frequency of said negative signals sig-1, sig-2 is selected in the range of 2-5 Hz in order to prevent flickering of the display. The above-mentioned sample and hold circuit 3, pulse generating circuit 7 and digital control circuit 8 together constitute the sample and hold means 30.

Power supply control means 11 is composed of an actuating signal generating circuit 11a for generating an actuating signal g-3 for a predetermined time upon receipt of a control signal sig-30 from the digital control circuit 8, and switch means 11b comprising a switch serially connected between the circuits 1, 2 and a power source 9, wherein said switch being opened to interrupt the power supply to said circuits, 1, 2 during a predetermined time from the start of sample holding in response to the sampling signal sig-2 to the data resetting in response to the reset signal sig-1.

In the following, the function of the circuit of FIG. 1 will be explained in conjunction with the time chart shown in FIG. 2. At time $t_{20}$ the digital control circuit 8 generates a reset signal sig-1 to reset the data register 5. In this state the calculating circuit 1 and the analog-digital converting circuit 2 are in operation by the current supplied from the power source 9 as the switch means 11b is closed to activate the power supply line 10a. At time $t_{21}$ a sampling signal sig-2 is generated to open the sampling gate 4, whereby the digital signal is transmitted from the analog-digital converting circuit 2 to the data register 5 and stored therein. The switch means 11b, which is still closed in this state, becomes open at time $t_{22}$ to interrupt the connection between the circuits 1, 2 and the power source 9, whereby the power consumption in the circuits 1, 2 becomes zero.

On the other hand the digital signal stored in the data register 5 immediately before the closure of the sampling gate 4 is suitably decoded by the display circuit for digital display.

The switch means 11b of the power supply control means 11 closes the power supply line 10a to initiate the power supply to the circuits 1, 2 a little before the reset signal sig-1 is generated again at time $t_{23}$, as the circuits 1, 2 require a certain time for reaching the completely activated state after connection to the power supply. Successively, the reset signal sig-1 is generated at time $t_{24}$, and the data register 5 is reset. The above-explained sequence is thereafter repeated.

In this manner the power consumption is reduced as the circuits 1, 2 are cut off from the power supply during the period $t_{22}$-$t_{23}$ which is unnecessary for the data sampling.

Figure 3:
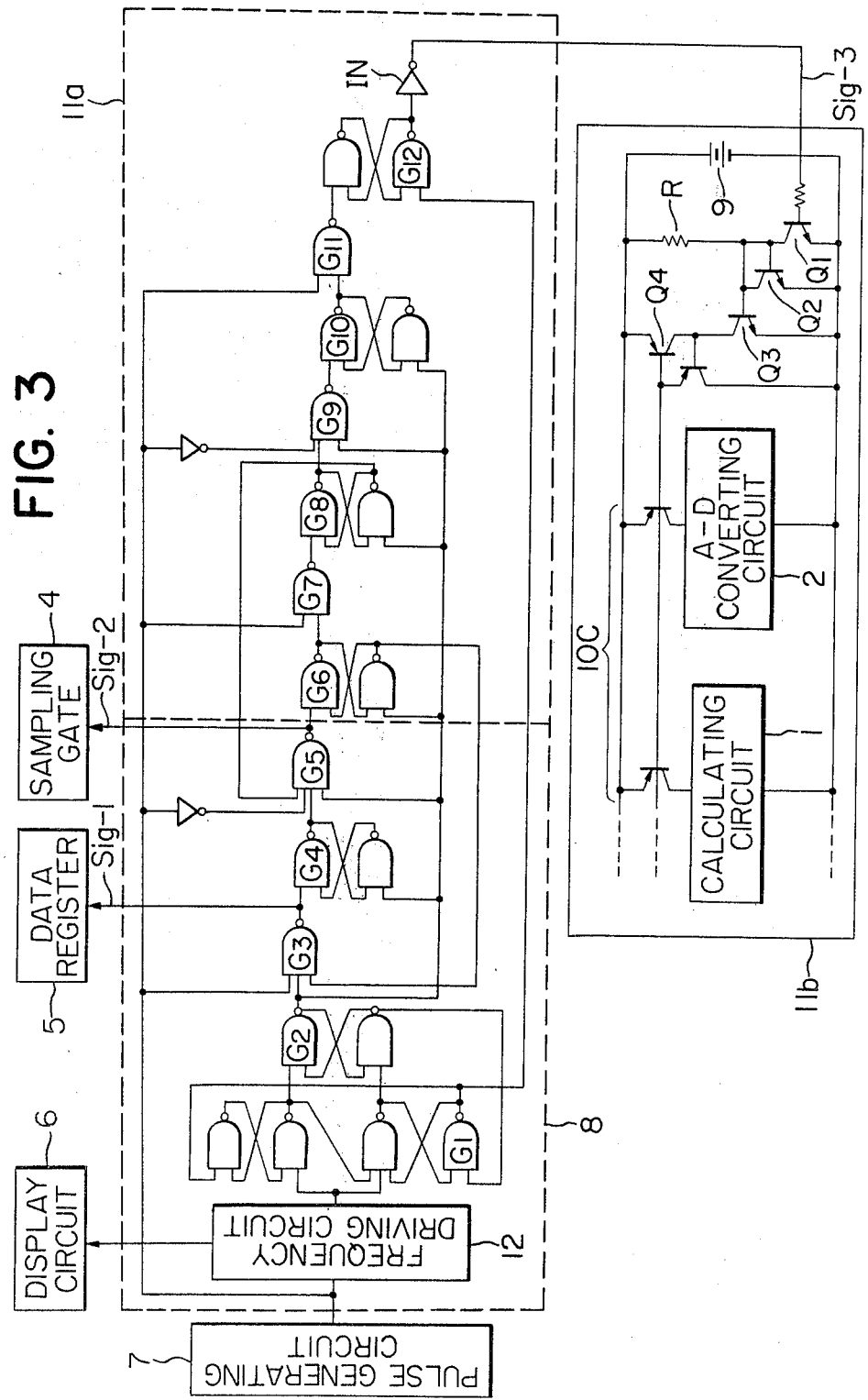
FIG. 3 is a circuit drawing of the digital control circuit and the power supply control circuit in the embodiment of FIG. 1 in combination with the peripheral circuits.

FIG. 3 shows an embodiment of the circuits 8, 11a and 11b shown in FIG. 1.

The pulses generated by the pulse generating circuit 7 are frequency divided for determining an appropriate data sampling frequency in a frequency dividing circuit 12 provided with a predetermined number of frequency dividing steps, wherein the output of an intermediate step is supplied as clock pulses to the display circuit 6. The output pulses from said frequency dividing circuit 12 are supplied to a 6-NAND gate type triggered flip-flop comprising gates G1 and G2, which is structured to change the output state of said gate G2 upon change of the input from L-level (low level) to H-level (high level). Similarly the frequency dividing circuit 12 is structured in such a manner that the frequency divided output thereof changes the state thereof upon change of the output of the pulse generating circuit 7 from the L-level to the H-level.

A shift register composed of the gates G3–G11 is structured to be in function when the gate G2 is at H-level and is reset and maintained out of function when said gate G2 is at L-level. A gate G12, when reset by the output of the gate G11 or set by the output of the gate G1, respectively, generates an L-level or H-level output which is transmitted through an inverter $I_N$ to a transistor Q1 of the switch means 11b, whereby said transistor Q1 changes to ON or OFF state, respectively, when the output of said gate G12 is at L- or H-level. The aforementioned reset signal sig-1 is obtained as the output signal of the gate G3 in said shift register, while said sampling signal sig-2 is obtained as the output of the gate G5 in said shift register. The control signal sig-30 is obtained as the combination of the pulses from the pulse generator 7, the outputs of the gates G1, G2 constituting said 6-NAND flip-flop and the output of the gate G5 in said shift register. The actuating signal sig-3 is obtained as the output from the inverter $I_N$. The switch means 11b is provided with a current Miller circuit composed of a resistor R and transistors Q2 and Q3 and having a load transistor Q4, whereby a constant current flows, while said current Miller circuit is in function, in the collectors of transistors 10c which are connected between the power source 9 and the circuits 1 and 2. The bases of transistors 10c are connected in common with the base of said transistor Q4.

In the above-explained embodiment the power supply control is achieved by the control of the constant current supply circuit used commonly for the circuits 1 and 2, but it is also possible to conduct power supply control selectively on the circuit elements of elevated power consumption, or to achieve such power supply control by switching of the power supply line to the circuits 1 and 2. The function of the above-explained circuit is explained in the following. Upon transition of the outputs from L-level to H-level of the frequency dividing circuit 12 and of the gate G2 in response to the transition from L-level to H-level of the clock pulse from the pulse generating circuit 7, the output of the gate G1 of the 6-NAND triggered flip-flop including the gates G1 and G2 shifts from L-level to H-level.

As the gate G1 is previously in the L-level state, the flip-flop including the gate G12 is in the set state and the output of the gate G12 becomes H-level output, whereby the transistors Q1 and Q4 are, respectively, turned off and on to supply the electric power to the circuits 1 and 2.

Figure 4:
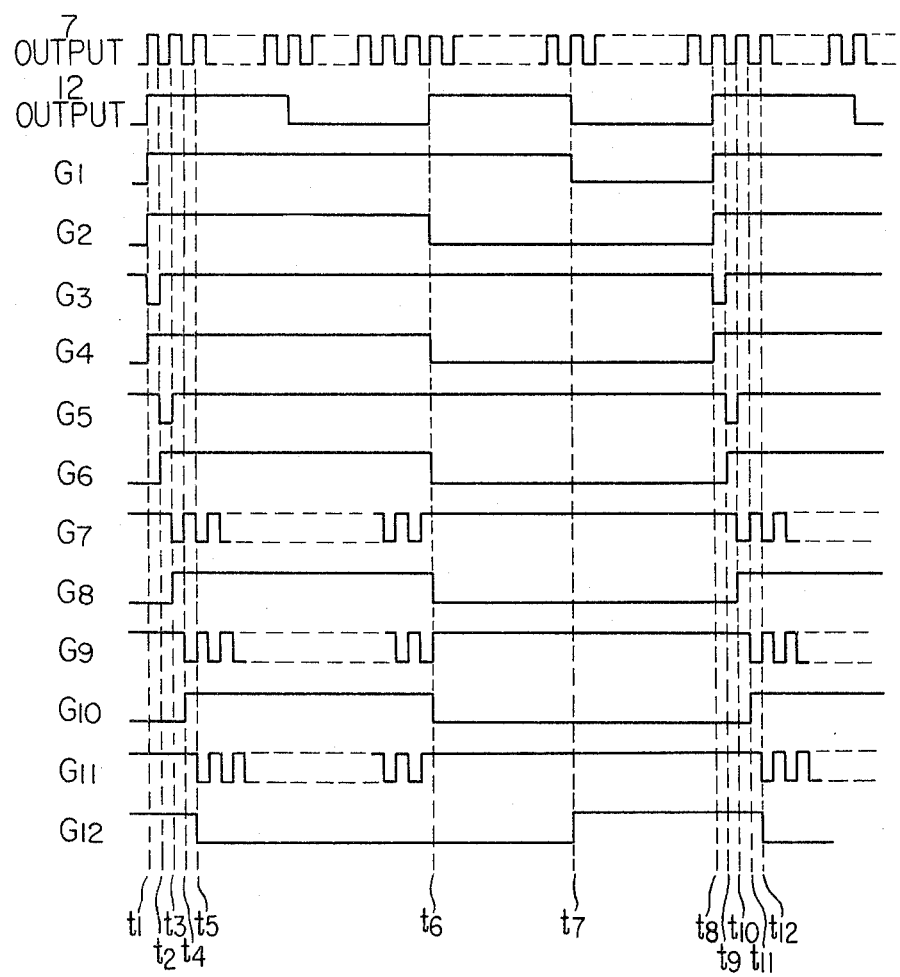
FIG. 4 is a wave-form chart of the clock pulses for explaining the function of the circuit shown in FIG. 3.

Similarly, the shift register composed of the gates G3–G11 is reset as the output of the gate G2 is previously in the L-level state. Upon shifting of the gate G2 to the H-level state, the gate G3 receives H-level input signals to produce an L-level output signal, which is transmitted as the reset signal sig-1 to reset the data register 5. Simultaneously, the flip-flop including the gate G4 is inverted to generate an H-level output signal therefrom. At this moment an L-level pulse is supplied from the pulse generating circuit 7 through the inverter to the gate G5 which therefore continues to issue an L-level output signal. No state change, including that of other gates, takes place until the pulse from the pulse generating circuit 7 changes from H-level to L-level at time t1 shown in FIG. 4. Upon such shift from the H-level to L-level of the clock pulse, the output of the gate G3 changes from L-level to H-level to change the data register 5 from the reset state. Simultaneously, the gate G5 receives H-level input signals to generate an L-level output signal which is transmitted as the sampling signal sig-2 to the sampling gate 4. In this state, the circuits 1 and 2 are in function as the output of the gate G12 is at H-level.

Thus the digital data generated from the analog to digital converting circuit and transmitted by the sampling gate 4 are stored in the data register 5 when set from the reset state. Also the L-level output from the gate G5 inverts the flip-flop circuit including the gate G6, whereby said gate G6 issues an H-level output signal. At the same time the gate paired with said gate G6 in said flip-flop generates an L-level output signal which is supplied as an input signal to the gate G3, the output of which is therefore maintained at the H-level state until the output of the gate G2 changes again from the L-level to H-level. In this state the gate G7, receiving an L-level clock pulse input, produces an H-level output signal as shown by t2 in FIG. 4. Upon subsequent change of the clock pulse from the L-level to H-level, the output of the gate G5 changes from L-level to H-level while that of the gate G7 changes from H-level to L-level to invert the flip-flop circuit including the gate G8, which thus generates an H-level signal. On the other hand, the output of the gate paired with the gate G8 in said flip-flop changes to the L-level, whereby the gate G5 continues to produce the H-level signal until the output of the gate G2 changes again from L-level to H-level. At this point the gate G9, receiving an L-level clock pulse input, continues to generate an H-level signal, as shown by time t3 in FIG. 4.

Upon a subsequent change of the clock pulse from the H-level to L-level, the gate G9 issues an L-level output signal which inverts the flip-flop circuit including the gate G10, thereby producing an H-level output signal therefrom. The gate G11, receiving an L-level input clock pulse, continues to issue an H-level output signal, as shown by time t4 in FIG. 3. Upon subsequently changing of the clock pulse from the L-level to H-level, the gate G11 generates an L-level output to invert the flip-flop circuit including the gate G12, thereby releasing an L-level output signal therefrom. Consequently the transistor Q1 is shifted to the ON state whereby the power supply to the circuits 1 and 2 is interrupted to terminate the function thereof. This state is represented by time t5 in FIG. 4. The gates G1 and G2 continue to produce H-level output signals when the output of the frequency dividing circuit 12 changes from H-level to L-level.

Upon a subsequent change of the output from the frequency dividing circuit 12 from L-level to H-level, the output of the gate G2 changes from H-level to L-level while the output of the gate G1 remains at the H-level. The shift register composed of the gates G3–G11 is reset by said change of the output of the gate G2 to L-level, as represented by t6 in FIG. 4. Upon a subsequent change of the output from the frequency dividing circuit 12 from H-level to L-level, the output of the gate G2 remains unchanged at the L-level, while that of the gate G1 changes from H-level to L-level, whereby the flip-flop circuit including the gate G12 is inverted to produce an H-level output signal therefrom. Consequently, the transistor Q1 is turned off to initiate the power supply to the circuits 1 and 2 for the next data sampling, as represented by time t7 in FIG. 4. Upon a subsequent change of the output of the frequency dividing circuit 12 from L-level to H-level, the outputs of the gates G1 and G2 change from L-level to H-level, whereby the gate G3 generates an L-level output signal to reset the date register 5, thereby cancelling the stored data therein. This state is represented by time t8 in FIG. 4 and is equivalent to the state at time t1, and the above-explained cycle is thereafter repeated periodically. In this manner the circuits 1, 2 are cut off from the power source at t5 immediately after the sampling operation of the digital data and again connected to the power source at time t7 preceding the succeeding data sampling by a determined period. In the present embodiment, in case the interval of clock pulse is negligibly short in comparison with the interval of operations of gate G2, i.e., that of data sampling, the ratio of the period from t7 to t12 during which the circuits 1, 2 are energized to the period from t1 to t8 becomes equal to ¼. Stated differently, the power consumption by the circuits 1 and 2 is reduced to ¼ in comparison with the case wherein the circuits 1, 2 are continuously supplied with the power. A further power saving can be achieved by reducing the period from t7 to t12.

Figure 5:
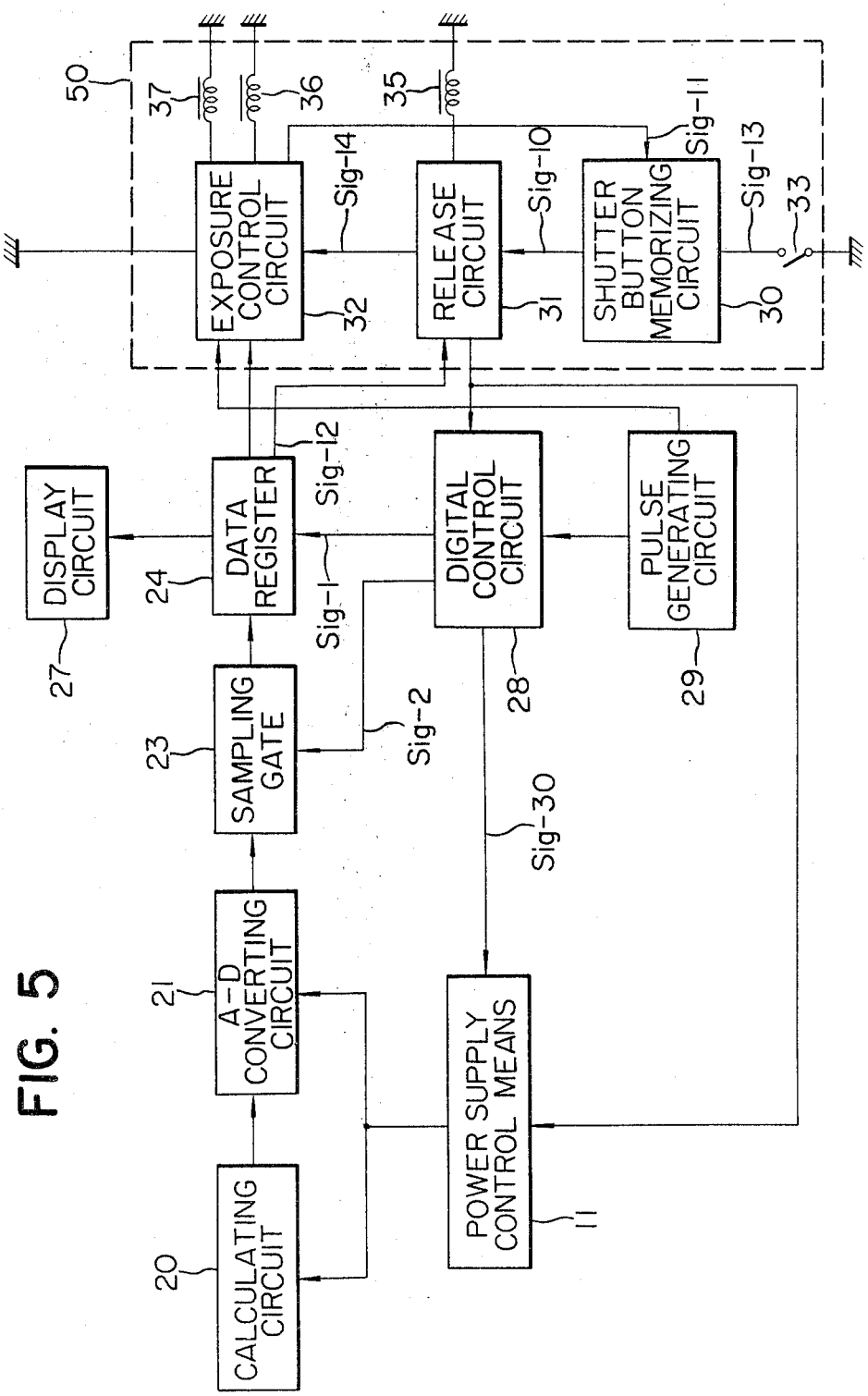
FIG. 5 is a block diagram showing another embodiment of the present invention.

FIG. 5 shows the block diagram of another embodiment of the present invention wherein the reduction of power consumption is rendered possible also in the exposure control step. In FIG. 5, a calculating circuit 20, receiving the brightness of an object and the sensitivity of photographic film as the input information, chooses either one of the shutter speed and the diaphragm stop value as the exposure calculating information, according to the photographing mode, and supplies the other to an analog-digital converting circuit 21 as an appropriate exposure control signal which is converted into a digital signal therein and supplied to a sampling gate 23. There is provided a power supply control means 11 for controlling the power supply to the calculating circuit 20 and the analog-digital converting circuit. Said sampling gate 23, controlled by a sampling signal sig-2, transmits the digital data from said converting circuit 21 to a data register 24, which stores said data therein until a reset signal sig-1 is received and generates a data storage signal sig-12 during the data storage. A display circuit 27 is provided to indicate the digital data stored in said data register 24 in the same manner as explained in the foregoing.

A digital control circuit 28, controlled by the clock pulses received from a pulse generating circuit 29, periodically generates reset signals sig-1 and sampling signals sig-2. A shutter button memory circuit 30 memorizes the actuation of a shutter button switch 33 linked with the shutter button, and generates a shutter button memory signal sig-10 during the period of such memory. Said memory of the shutter button memory circuit 30 is reset by a memory reset signal sig-11 produced upon completion of the exposure control by the exposure control circuit 32. There is provided a release circuit 31 to energize, in response to the shutter button memory signal sig-10 from said shutter button memory circuit 30 and the data memory signal sig-12 from the data register 24, a release magnet 35 to trigger the camera mechanism. Said release circuit 31 generates and AND signal upon receipt of said signals sig-11 and sig-12 to transmit, in addition to the energization of the release magnet 35, a stop signal sig-13 to the digital control circuit 28 and the power supply control circuit 22, thereby interrupting the generation of the reset pulse signals sig-1 and the sampling pulse signals sig-2. As the result, the data register 24 is set from the reset state and the sampling gate 23 becomes closed. A power supply control means 11, being provided to control the power supply to the circuits 20, 21 as already explained in the foregoing, is controlled by the control signal sig-30 from the digital control circuit 28 or the stop signal sig-13. Said control means 11 can be composed of an OR gate or by the transistor 30 shown in FIG. 3 receiving the signal sig-30 at the base thereof. Also said release circuit 31, simultaneously with the energization of the release magnet 35, supplies said AND signal as the release signal sig-14 to activate the exposure control circuit 32, thereby performing the digital exposure control in a known manner by controlling a shutter magnet 36 and a diaphragm magnet 37 according to the digital data stored in the data register 24 and according to the predetermined photographing mode. Said exposure control circuit 32, upon closure of the shutter by said shutter magnet, issues a memory reset signal sig-11 to the shutter button memory circuit 30. The exposure mechanism 50 is composed of the above-mentioned components 30, 31, 32, 33, 35, 36 and 37.

The power supply to the circuits 20, 21 is controlled, during the light measurement prior to the closure of the shutter button switch 33, by the control of the power supply control circuit through the control signal sig-3 from the digital control circuit 28, in the same manner as explained in the foregoing.

Upon closure of the shutter button switch 33 by the actuation of the shutter button, the shutter button memory circuit 30 issues a shutter button memory signal sig-10 continuously until the receipt of the memory reset signal sig-11 from the exposure control circuit 32, even after said shutter button switch 33 is opened again. The release circuit 31, in response to the shutter button memory signal sig-10 and the data memory signal sig-12, energizes the release magnet 35 to initiate the camera mechanism. In case the data register 24 is in the reset state or the digital data are not completely transmitted from the analog-digital converter 21 to the data register 24, the release magnet 35 is not energized, since the data memory signal sig-12 is not transmitted from the data register 24 to the release circuit 31. Upon energization of said release magnet 35, the release circuit 31 supplies the stop signal sig-13 to the control circuit 28, whereby the reset signal sig-1 is prevented from resetting the data register while the sampling signal sig-2 holds the gate closed. On the other hand, the power supply control means 11, upon receipt of the stop signal sig-13, interrupts the power supply. Similarly, upon energization of the release magnet 35, the release circuit 31 supplies the release signal sig-14 to the exposure control circuit 32, which therefore performed the exposure control according to the data stored in the data register 24. Upon closure of the shutter by the shutter magnet 36, the exposure control circuit 32 supplies the memory reset signal sig-11 to the shutter button memory circuit 30 to reset the memory, whereby the release circuit 31 no longer generates the stop signal sig-13 and release signal sig-14 to deactivate the exposure control circuit 32. In this manner, the digital control circuit 28 and the power supply control means 11 are shifted to the state of light measurement. The present embodiment allows a further power saving and is most suitable for cameras utilizing small batteries since the circuits 20, 21 are activated only during the period necessary for data sampling for light measurement and cut off from the power supply in other period including the period for exposure control.

The data register 24 shown in FIG. 5 is supposed to be capable of producing the data memory signal sig-12, but such function, if not achievable by the data register 24 itself, can be achieved by an additional NAND gate as shown in FIG. 6, which receives the reset signal sig-1 and the sampling signal sig-2 and produces an L-level signal when said input signals are both in the H-level (cf. FIG. 7). This can be achieved, more specifically by connecting the output terminal of the gate G3 in FIG. 3 to an input terminal of the NAND gate in FIG. 6, the output terminal of the gate G5 in FIG. 3 to the other input terminal of said NAND gate, and the output terminal thereof to the input terminal of the release circuit 31 in FIG. 5.

I claim:

1. In a camera having an electric power supply, a calculating circuit for generating an analog signal corresponding to an appropriate exposure in response to an input exposure factor such as the brightness of an object, an analog-digital converting circuit for converting said analog signal into a digital signal and sample and hold means for periodically sampling said digital signal and holding said signal for a predetermined period, and means for determining and indicating the exposure by means of said held digital signal, a power supply control apparatus comprising power supply control means for interrupting the power supply to at least either one of said calculating circuit and analog-digital converting circuit for a predetermined time within said predetermined period.

2. An apparatus according to claim 1, wherein said power supply control means comprises actuation signal generating means for generating an actuation signal during said predetermined time, and switch means comprising a switch connected serially between the power supply and at least either one of said calculating circuit and analog-digital converting circuit and opened in response to said actuation signal.

3. An apparatus according to claim 2, wherein said actuation signal generating means generates said actuation signal in response to a signal for controlling the sampling frequency and the holding time of said sample hold means.

4. An apparatus according to claim 3, wherein the actuation signal from said actuation signal generating means terminates during said predetermined period to permit the restart of sampling of digital data by said sample and hold means, the time period between the termination of the actuation signal and the restart of sampling of digital data being at least equal to the period required by said calculating circuit and/or said analog-digital converting circuit to regain a normal functioning state after reconnection to the power supply.

5. An apparatus according to claim 2, wherein said switch means is controlled by a signal from an exposure device of the camera so as to be opened from the start to the end of the exposure.

* * * * *